United States Patent [19]

Spash

[11] 4,422,115
[45] Dec. 20, 1983

[54] LIGHTWEIGHT DUAL HEAD SUPPORT ASSEMBLY FOR MAGNETIC DISK DRIVES

[75] Inventor: John L. Spash, Harvard, Mass.

[73] Assignee: Digital Equipment Corporation, Maynard, Mass.

[21] Appl. No.: 283,163

[22] Filed: Jul. 14, 1981

Related U.S. Application Data

[63] Continuation of Ser. No. 126,020, Feb. 29, 1980, abandoned.

[51] Int. Cl.³ .......................... G11B 5/48; G11B 21/16
[52] U.S. Cl. .................................................. 360/104
[58] Field of Search ................... 360/104, 102–103, 360/106, 122, 128–129, 130.3

[56] References Cited

U.S. PATENT DOCUMENTS

| | | | |
|---|---|---|---|
| 3,701,610 | 10/1972 | Buslik et al. ...................... | 360/103 X |
| 3,984,873 | 10/1976 | Pejcha ................................ | 360/98 X |
| 4,107,748 | 8/1978 | Ho ....................................... | 360/104 |
| 4,120,010 | 10/1978 | Mitsuya et al. ....................... | 360/103 |
| 4,196,456 | 4/1980 | Manzke et al. ....................... | 360/106 |
| 4,197,566 | 4/1980 | Suzuki et al. ..................... | 360/104 X |

FOREIGN PATENT DOCUMENTS

| | | | |
|---|---|---|---|
| 52-57814 | 5/1977 | Japan ................................... | 360/104 |
| 19083 | 11/1980 | United Kingdom ................. | 360/104 |

OTHER PUBLICATIONS

Computer Design, Apr. 1978, pp. 208–209 "Winchester-Technology . . . "

Primary Examiner—John H. Wolff
Attorney, Agent, or Firm—Cesari and McKenna

[57] ABSTRACT

A lightweight assembly for suspendingly supporting a pair of magnetic read/write heads and associated sliders from a head-positioning arm, for use in disk type mass storage units. The assembly is formed entirely of aluminum and is intended for mounting to an aluminum arm. A single, unitary flexure supports both head/slider assemblies. The middle of the flexure is secured to the arm, with the longitudinal axis of the flexure transversely spanning the arm so as to support each head in cantilevered fashion, one on each side of the arm's longitudinal axis. A single unload needle can be inserted in a channel running parallel to the longitudinal axis of the flexure for removing the pre-load force from both slider air bearings.

3 Claims, 7 Drawing Figures

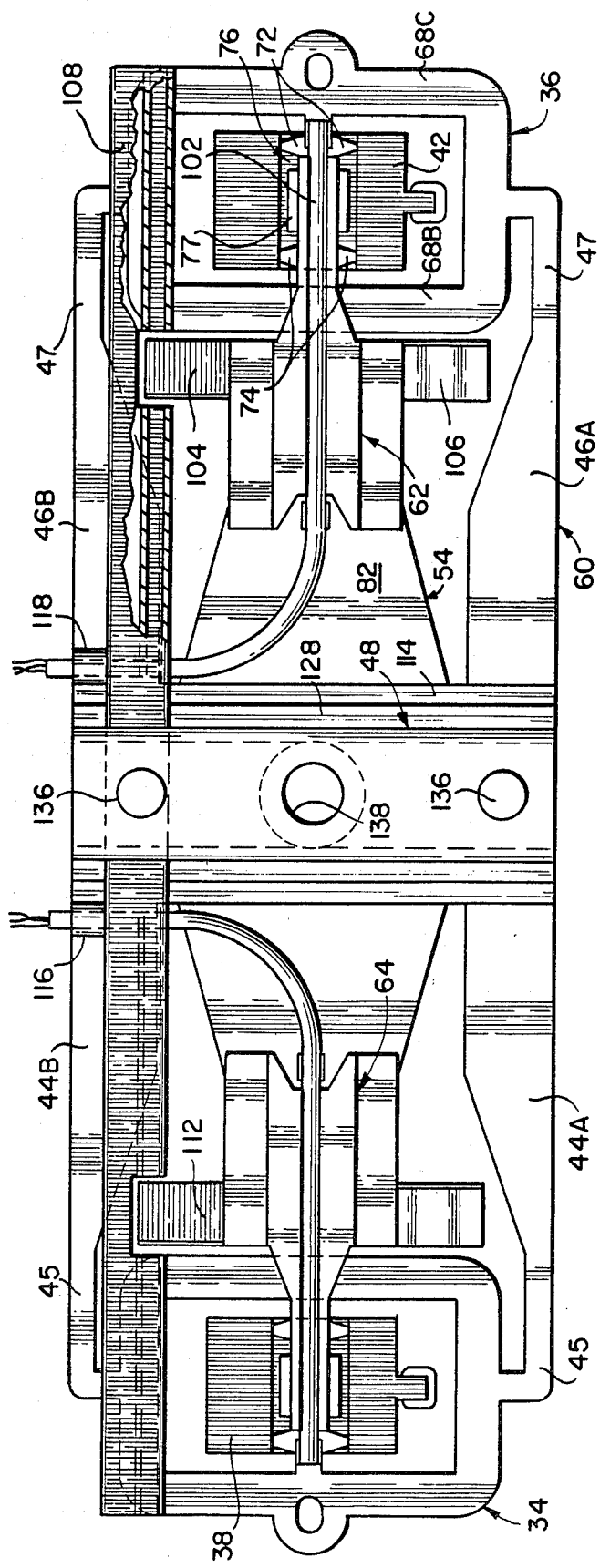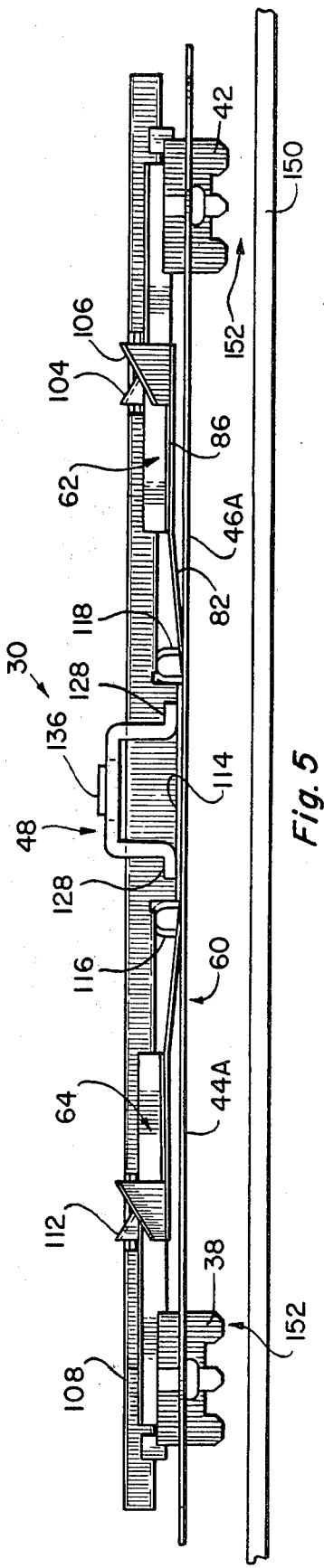

LIGHTWEIGHT DUAL HEAD SUPPORT ASSEMBLY FOR MAGNETIC DISK DRIVES

CROSS-REFERENCE TO RELATED APPLICATIONS

This application is a continuaion of Ser. No. 126,020, filed Feb. 29, 1980, and now abandoned.

FIELD OF THE INVENTION

This invention relates to the field of digital electronic recording and, in particular, to disk drive recording systems. More precisely, the invention relates to a lightweight support assembly for the magnetic recording transducers, or heads, used in such disk drives.

BACKGROUND OF THE INVENTION

In disk-type magnetic recording systems for digital applications, magnetic transducer elements, or heads, are used to write information onto (i.e., record) or read information from (i.e., playback) the disk surface or surfaces. Each head must be supported in close proximity to the associated disk surface, to permit low levels of magnetic flux to be employed and, in turn, high bit densities to be achieved.

To this end, each head is mounted in an aerodynamically designed member, termed a "slider"; together they comprise a slider/head (or head/slider) assembly. Rapid rotation of the disk causes a cushioning film of air to develop between the slider/head assembly and the disk surface; the slider flies over the disk surface, supported by this film. The air support is referred to as a bearing or, more specifically, the slider or air bearing.

An electro-mechanical positioning assembly, or actuator, is used to move each recording head to successive locations on the disk surface where information is to be either written or read. The positioner assembly includes one or more actuator arms and an actuuator motor. When multiple actuator arms are employed (e.g., in association with multiple disk surfaces), they move in unison. Each head is mounted near the end of an appropriate one of the actuator arms and the actuator motor moves the actuator arm(s) as one, to bring the head(s) into the desired position.

The magnetic heads and their sliders are not mounted directly on the actuator arms; rather, each head/slider assembly is mounted on a separate support structure which, in turn, is mounted to and suspended from an actuator arm.

Head positioning assemblies are generaly of two types: (1) linear and (2) rotary. Linear positioners move the actuator arms(s) and, thus, the head(s), along a linear path oriented parallel to a radius of the recording disk(s). Rotary positioners, by contrast, rotate the actuator arm(s) about a pivot point outside, but close to, the rim of the recording disk(s). This invention relates to rotary head positioners.

In the prior art, the magnetic head/slider assemblies and the supports used for suspending and sliding them over the disk surface(s) are cantilevered from an actuator arm which is substantially more massive by comparison. In general, the heads are employed and mounted in pairs, to reduce the access-time required for positioning a head over a desired disk track; the two heads of each pair are cantilevered in parallel, spaced-apart relationship, both on one (i.e., the same) side of the actuator arm.

The design of a head support structure is dictated to a large extent by the requirement that read/write operation be unimpaired over the range of temperatures to be encountered in the disk drive. As temperature change, expansion and contraction of disk surfaces causes relative motion between disks and heads. To begin with, temperature variations affect the recording disks individually. Disk-to-disk termperature differentials give rise to other, further problems.

A typical recording disk comprises an aluminum or similar substrate which is coated with a ferro-magnetic material. The thermal properties of the disk are principally established by the thermal properties of the aluminum substrate. In general, each disk recording surface is divided into a number of concentric bands, or tracks, with adjacent tracks separated by a buffer zone. Information is recorded within the track boundaries. The position of each track and, correspondingly, the spacing between adjacent tracks, is a function of the temperature of the aluminum substrate; the disk substrate will expand or contract radially as the temperature varies.

Frequently, several (e.g., typically four or six) disks will be stacked on a common spindle. The actuator arms for these multiple disks are correspondingly stacked, in fixed relation to one another. One of the disk surfaces is used to record servo information which is used by the actuator motor control circuitry for locating the recording tracks on the other disk surfaces. If the temperature of the servo disk surface differs from that of the other disks, the servomechanism which drives the actuator arms may be unable to position the heads at the proper track locations. That is, temperature differentials may cause corresponding tracks to lose their vertical alignment.

Minimization of disk surface-to-disk surface temperature differences is necessary to resolve the latter problem. The former problem is dealt with by proper design of the head support structures.

To match the thermal coefficient of the aluminum disk substrate, the head/slider support assemblies are generally also made of aluminum. When each of a pair of heads is supported by such an aluminum structure, both are mounted to one side of the arm, in an attempt to make the spacing between the heads vary as a function of temperature in the same manner as the spacing between adjacent disk recording tracks varies.

Frequently, stainless steel is used as an additional element in a head support assembly, as a link between the aluminum head support elements and each head. The stainless steel member is fixed to the actuator arm and the aluminum head supports are, in turn, secured to the stainless steel member outboard of the arm.

Various disadvantages are attendant to such prior art structures. Chiefly, they are relatively massive, expensive to fabricate, and are not balanced.

SUMMARY OF THE INVENTION

The present invention, by contrast, provides a dual head support assembly with a very low nominal mass, only about 0.720 grams in the exemplary embodiment. This low mass provides the actuator arm with a low inertia load and, therefore, reduces the actuating motor size requirements, increases its efficiency. It also lowers the cost of the motor and of the entire actuator assembly.

Further, since access time (i.e., the time for positioning a head at a desired track location) is directly related to the inertia of the arm and head assembly which must be moved by the actuator motor, the present invention also contributes to a reduction in access time.

According to the present invention, a single, integral assembly supports a pair of heads. One of the heads is disposed on each side of the longitudinal axis of the actuator arm. At the heart of the support assembly is a single aluminum flexure which supports two slider bearings, one for each head. The aluminum flexure is mounted directly on the end of the actuator arm, in substantially transverse orientation with respect thereto. No stainless steel interface is needed. The actuator arm is also aluminum, to minimize intertia. Therefore, the flexure is fixed to the arm by a combination of resistive welding and an epoxy adhesive.

With one head mounted to each side of the actuator arm (rather than both heads being mounted on the same side of the arm, as in the prior art), there is a substantial reduction in the length of the head support which is cantilevered from the arm, while the same head-to-head spacing is maintained.

For operation over a rapidly rotating disk, a pre-load force is applied by the flexure to each head slider bearing, to push each head toward the disk surface it faces. For assembly of the disk drive or removal or replacement of the actuator assembly or heads, the head support structure also is provided with easy-to-use means for removing the pre-load on the slider bearings.

The entire head support assembly is made of aluminum, which makes it inexpensive in terms of both material costs and fabrication costs.

The invention accordingly comprises the features of construction, combination of elements, and arrangement of parts which will be exemplified in the following detailed description. The scope of the invention will be indicated in the appended claims.

BRIEF DESCRIPTION OF THE DRAWINGS

For a fuller understanding of the nature and objects of the invention, reference should be had to the following detailed description, taken in connection with the accompanying drawings, in which:

FIG. 4 is a top plan view of the dual head/slider support assembly of FIG. 3, with the transducer heads shown in the nominal flying position;

FIG. 5 is a side elevational view of the head/slider support assembly of FIG. 4, likewise showing the heads in nominal flying position;

DESCRIPTION OF THE PREFERRED EMBODIMENT

Figure 1:
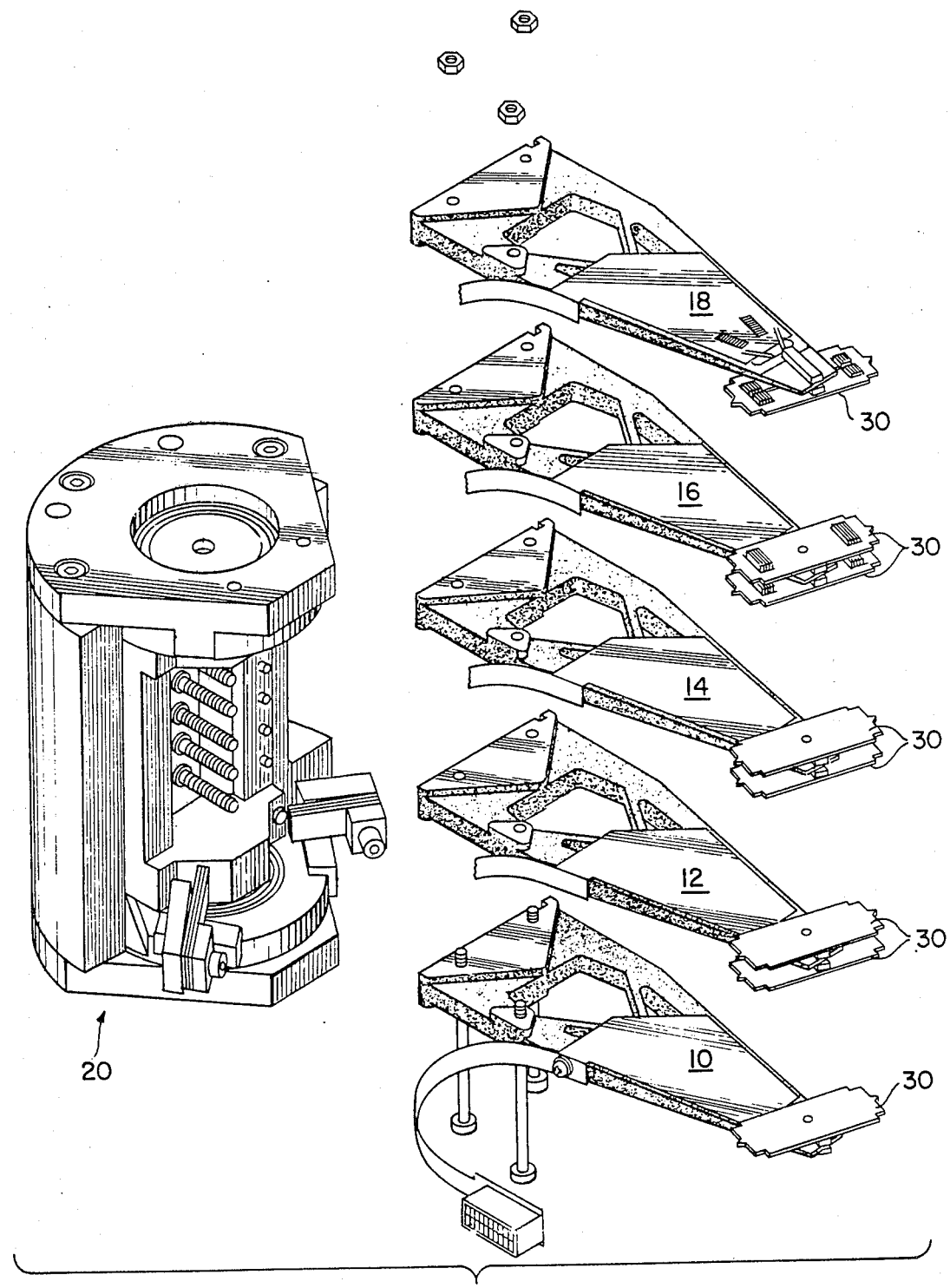
FIG. 1 is a partially exploded, isometric view showing five actuator arms each equipped with either one or two dual-head/slider support assemblies according to the present invention and an appropriate rotary actuator motor for moving the arms and, thus, the heads.

FIG. 1 is presented to place the present invention in context. As shown therein, an actuator assembly for a multiple disk recording system having, e.g., four disks, has a corresponding number (e.g., five) of head positioning arms 10–18. A rotary actuator motor 20 moves the arms into the desired positions. At the end of each arm 10–18 there is mounted either one or two dual head/slider support assemblies 30 according to the present invention. in use, the lowermost disk, not shown, occupies a space between arms 10 and 12; therefore, arm 10 supports only a single pair of heads which are used in association or conjunction with the bottom surface of the lower-most disk. Each of arms 12–16, by contrast, supports two pairs of heads, one for the upper surface of the disk situated below the arm and one for the lower surface of the disk situated above the arm. Arm 18 supports only a single pair of heads on a single dual-head support assembly, for operation in association with the top surface of the upper-most disk of the stack.

As explained more fully below, each assembly 30 comprises a structure for supporting a pair of heads, one mounted on each side of the axis of the respective actuator arm, at the end of that arm distal the actuator motor 20.

Figure 2:
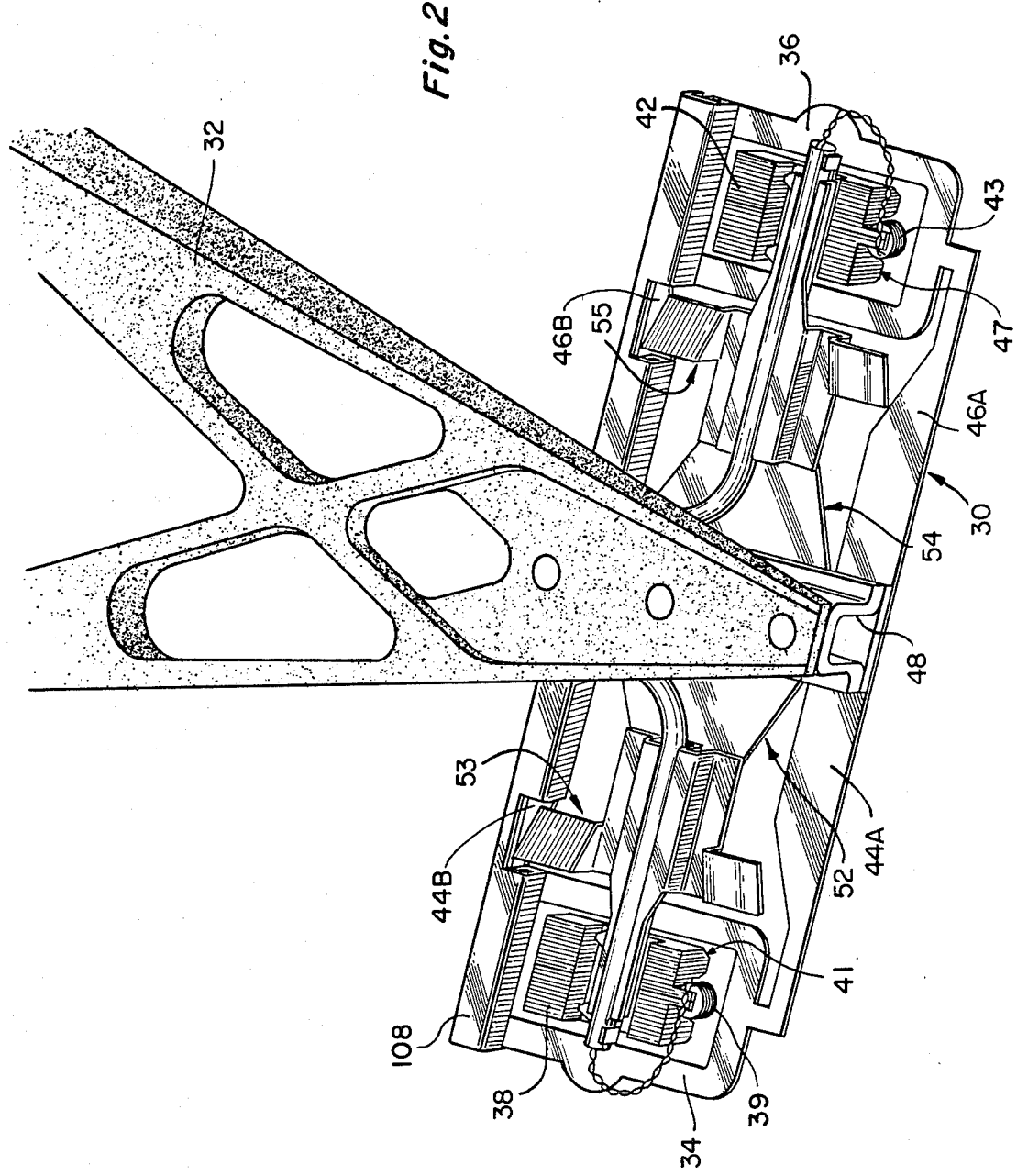
FIG. 2 is a top, isometric view of a dual-head/slider support assembly according to the present invention, shown mounted on the end of an actuator arm.

Turning now to FIG. 2, the magnetic head support assembly of the present invention is shown in greater detail. In that figure, a portion of the outer end of an exemplary arm 32 is shown with a single dual-head/slider support assembly 30 mounted thereon. The dual-head/slider support assembly 30 comprises one piece flexure member common to the support of both heads and including first and second slider frames 34 and 36, respectively. Each slider frame supports a composite slider and recording head assembly, 38 and 42, respectively. (For example, composite slider/head assembly 38 included a head 39 and a slider member 41.) Each slider frame is fixed to a pair of arms, 44A and 44B or 46A and 46B, of the flexure, as indicted. A U-shaped channel member 48 extends transversely across the middle of the assembly 30, providing structural stiffening at that location and also serving as a place for attaching the head/slider support assembly to an actuator arm.

A load spring 52 is provided for applying a pre-load force to the air bearing between head/slider assembly 38 and the disk surface. The air bearing is provided by the air pressure distribution produced by the slider profile when the slider and head fly over a rapidly rotating disk. Correspondingly, a load spring assembly 54 is provided for applying a slider pre-load force to the air bearing associated with head/slider assembly 42. Slider bearing unload mechanisms, shown generally at 53 and 55, and explained below, permit the pre-load force to be removed from the slider bearings, to facilitate insertion of the actuator assembly and heads into a disk drive without causing damage to either the recording medium or the head support structure.

Figure 3:
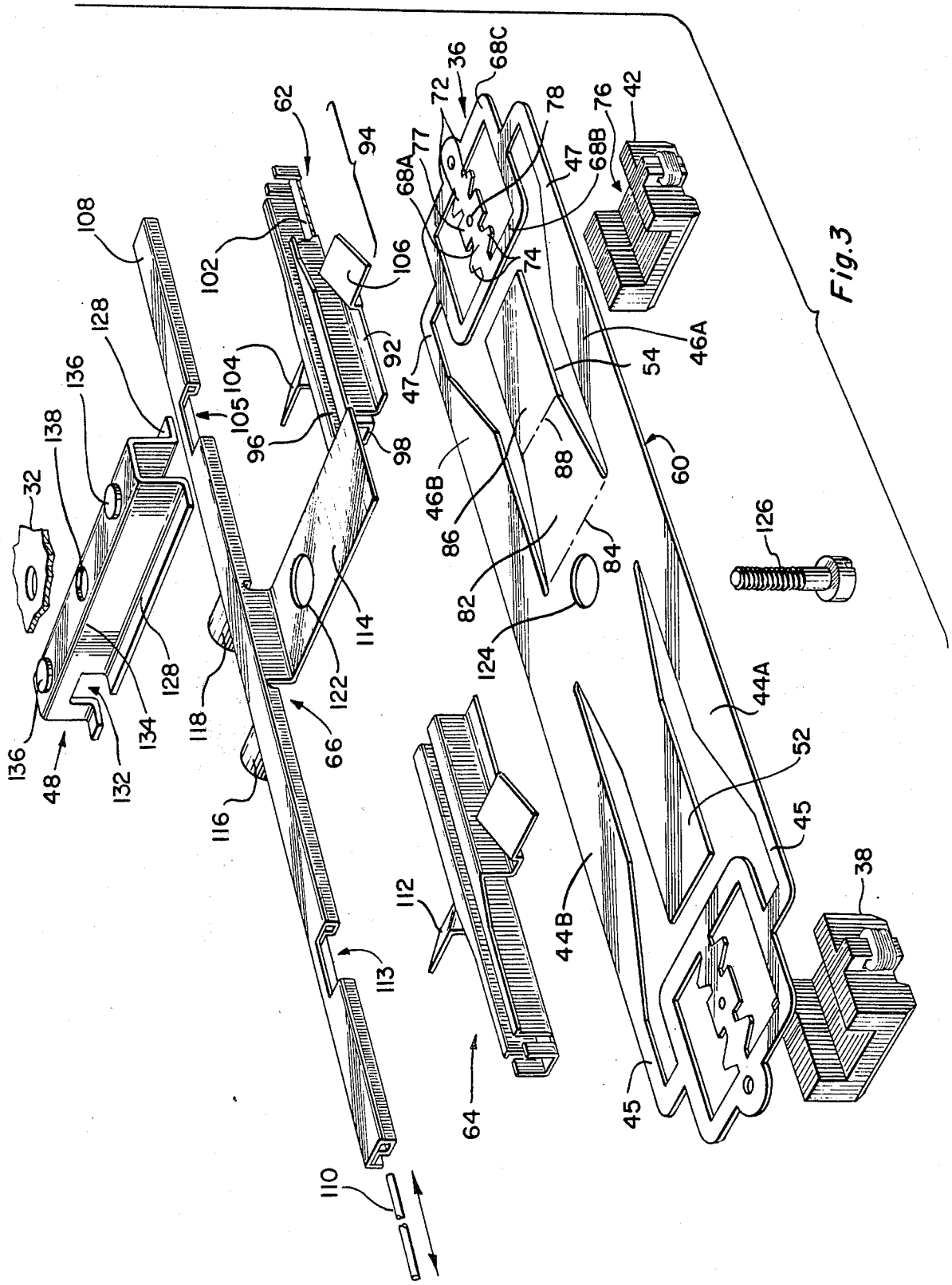
FIG. 3 is an exploded view of a dual head/slider support assembly according to the present invention.

For a more complete understanding of the invention, it will be helpful to refer also to FIG. 3, which depicts an exploded view of the dual-head/slider support assembly of the present invention. There are five components to each dual-head/slider support assembly constructed in accordance with the present invention: a one-piece flexure member 60 which is common to both supports; two pre-load springs 52 and 54, two load fingers, 62 and 64; a load/unload channel and head wire retainer assembly 66; and a U-shaped-channel stiffening member 48.

The flexure 60 is formed of thin sheet aluminum stock cut substantially in the shape shown in the drawing. It is symmetrical about both its longitudinal axis and its transverse axis. A portion of the sheet stock serves as each load spring 52, 54. Load springs 52 and 54 are identical to each other, as are load fingers 62 and 64, although they face 180 degrees apart. Therefore, it will suffice to explain the structure of only one-half of assembly 30, pertaining to the support of one head/slider; the support structure for the other head/slider is identical.

Referring to the structure associated with head/slider 42, flexure 60 has a pair of side arms 46A and 46B extending from its middle and running longitudinally along its sides to one end of the flexure, where they terminate in a slider frame 36. Arms 46A and 46B are relatively massive over a substantial portion of their length and then taper to a thinner (and less massive), and therefore more flexible, portion 47 which spans approximately the outer third of their length. The slider frame 36 includes a slider/head-retaining bridge section 68A extending longitudinally between the two transverse legs 68B, 68C of the frame 36. Bridge 68A is provided with first and second pairs of triangular, pointed wings 72 and 74 dimensioned to cooperate with and retain slider/head assembly 42 by fitting into a matching U-shaped groove 76 therein, so that the slider is received into the frame 36 when installed. Mediate the pairs of pointed tabs 72 and 74, the bridge 68A is provided with a pad 77 which has a protruding hemispherical dimple 78 centrally positioned therein. The role of this dimple is explained below.

A tongue-shaped portion 54 of flexure member 60, positioned between arms 46A and 46B constitutes a leaf spring for applying a pre-load force to the slider air bearing. Tongue 54 comprises a trapezoidal spring portion 82 having its longer base along line 84 and tapering down to a rectangular, force-transferring portion 86 extending from the shorter trapezoid base at dashed line 88. A load finger 62 is secured to the rectangular portion 86 of tongue 54, to transfer the load force from the leaf spring to the head/slider air bearing. For this purpose, load finger 62 comprises a first, load-force-acquiring portion 92 which is secured to rectangular portion 86 of tongue 54 (by, for example, welding and an adhesive), and a second, extension portion 94 which overhangs slider frame bridge 68. Load finger 62 is formed of an appropriately shaped and bent piece of aluminum sheet stock.

Load finger 62 has a central U-shaped channel 96 running its entire length. The mouth of channel 96 faces upward (i.e., away from the flexure) and its lower web 98 is affixed, in region 92, to portion 86 of tongue 80. The actual pre-load force is transferred through the contact of web 98 in region 94 of the load finger with slider/head frame 36. Web 98 of channel 96 is provided with a flat protruding pad 102 positioned so as to be seated on dimple 78 of bridge 68; the pad 102 thus transfers the load force from load finger 62 to dimple 78 which is accurately and strategically located relative to the slider and its air bearing. Misplacement of the load force with respect to the slider would cause the pressure profile at the face of the slider and, therfore, the air bearing to deviate from the design conditions, perhaps even causing the air bearing to fail to support the head and slider.

A pair of oppositely inclined ramps 104 and 106 are formed on opposite sides of load finger 62; these ramps are usable in conjunction with the load/unload channel 108 and an unload needle or wire 110 for relieving the pre-load force from the head slider assembly 42. Ramp 104 may incline toward either end of flexure 60, provided that ramp 106 is oppositely inclined; the choice of direction of incline of the ramps will determine whether the unload needle 110 is to be inserted into the unload channel 108 from the left side of the figure or from the right side. Of course, ramps 104 and 112 must be inclined in the same direction. As illustrated in FIG. 3, the directions of inclination of the ramps 104 and 106 is such that needle 110 must be inserted from the left end of unload channel 108. Channel 108 is provided with cutaway portions or openings 105 and 113 for receiving ramps 104 and 112, respectively. When unload needle 110 is inserted into the left end of unload channel 108, and pushed toward the right, it first impinges upon the bottom surface of side ramp 112 of load finger 64, causing ramp 112 to ride up over the unload needle 110, thereby raising load finger 64 and removing the pre-load force from the associated head/slider assembly 38. Continued insertion of needle 110 results in its end impinging on the lower surface of side ramp 104 of load finger 62, causing that ramp to ride up over the unload needle, and correspondingly raising load finger 62 and head/slider assembly 42.

Load/unload channel and wire-retainer assembly 66 includes, in addition to the load/unload channel 108, a mounting plate 114 and two wire-retaining clamps 116 and 118. Mounting plate 114 is welded to flexure 60, with the central aperture 122 of the base 114 aligned with the central aperture 124 of flexure 60. The diameters of apertures 122 and 124 are large enough to permit the passage of the head of bolt 126.

The bottom of load/unload channel 108 is elevated slightly from base 114 to permit passage of wires thereunder to be retained by retainers 116 and 118. Thus, the leads from the read/write heads are conducted down the channels in the load fingers (e.g., channel 96) and are then bent 90 degrees to pass underneath the load-/unload channel and through the retainers 116 and 118; the wires are clamped by those retainers, to provide strain relief.

Cross beam 48 comprises an inverted U-shaped channel with flanges 128 at the open end thereof for securing the beam to the mounting base 114. A cut-out 132 is provided in the wall of beam 48 for receiving passage of the load/unload channel 108. For securing beam 48 to the actuator arm, the top web 134 thereof includes a pair of circular raised pads 136 and an aperture 138 for receiving the shaft of bolt 126. The actuator arm has correspondingly placed holes for receiving pads 136 and bolt 126.

FIG. 4 is merely a top view of a fully assembled head support according to the present invention, as shown in the exploded view of FIG. 3.

Figure 6:
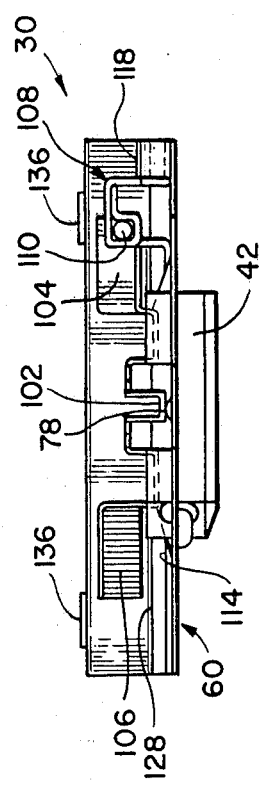
FIG. 6 is an end elevational view of the structure of FIG. 5.
Figure 7:
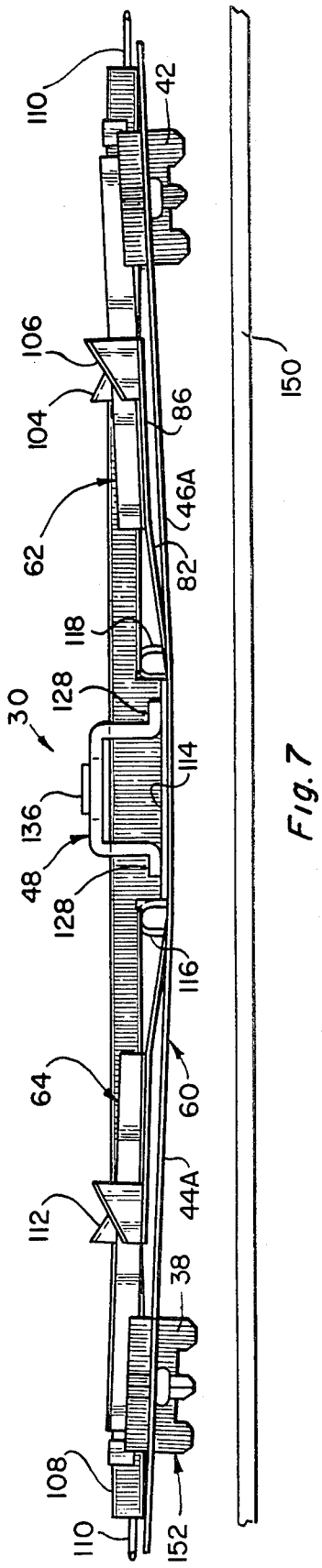
FIG. 7 is a side view comparable to that of FIG. 5, but showing the heads in the unloaded position.

In FIG. 5, there is shown a side view of the assembly according to FIG. 4, with the load needle removed and the head/slider assemblies in a simulated flying position relative to an underlying portion of a rotating recording disk 150. Air bearings are generally indicated between disk 150 and head/slider assemblies 38 and 42 at reference numeral 152. An end elevational view of the structure of FIG. 5 is shown in FIG. 6. In particular, FIG. 6 more clearly depicts the positioning of the load/unload channel relative to the side ramps on the load fingers. FIG. 7 shows the same side elevational view as in FIG. 5, except that the unload needle 110 has been inserted, thus raising head/slider combinations 38 and 42 to their unloaded positions, with the pre-load forces removed from the underlying air-bearing.

It will thus be seen that the objects set forth above, among those made apparent from the preceding description, are efficiently attained. And, since certain changes may be made in the above construction without departing from the scope of the invention, it is intended that all matter contained in the above description or shown in the accompanying drawings be interpreted as illustrative only, and not in a limiting sense.

It is also to be understood that the following claims are intended to cover all of the generic and specific features of the invention herein described.

What is claimed as new and desired to be secured by Letters Patent of the United States is:

1. In a disk drive mass storage unit of the type having at least a pair of read/write heads and a slider member associated with each head for creating an air bearing to support the head when the head is stationed over the surface over a rotating storage disk, each head and associated slider forming a head/slider assembly, and a head positioning arm member adapted to move the head slider assemblies accross the surface of the disk, the improvement comprising:
  head suspending means for suspendingly supporting each head from a common point on the arm member, in cantilevered fashion, with one head disposed on each side of the longitudinal axis of the arm member;
  the head suspending member means including a unitary flexure member adapted to be secured to the arm member proximate the middle of the flexure member, the flexure member further having first and second ends distal the middle of the flexure, and, at each of such ends a slider frame adapted to support a head/slider assembly and further including, for each head/slider assembly, means for applying a pre-load force thereto;
  the means for applying a pre-load force including, for each head/slider assembly, a resilient spring member and means for transferring a force from the spring to the head/slider assembly;
  a channel-shaped member running the length of the flexure member along one side thereof and adapted to receive a stiff, elongate wire or needle therein;
  the force-transferring means associated with each head/slider assembly including a ramp member depending toward the channel-shaped member;
  the channel-shaped member having a cut-away portion adapted to receive the ramp from the forced-transferring means;
  a stiff, elongate wire adapted to be inserted in the channel member from one end thereof; and
  the ramp members being adapted to ride up over the elongate wire when the wire is inserted into the channel member from one end thereof, to remove the pre-load force from the head/slider assemblies.

2. In a disk drive mass storage unit of the type having at least a pair of read/write heads and a slider member associated with each head for creating an air bearing to support the head when the head is stationed over the surface over a rotating storage disk, each head and associated slider forming a head/slider assembly, and a head positioning arm member adapted to move the head slider assemblies accross the surface of the disk, the improvement comprising:
  head suspending means for suspendingly supporting each head from a common point on the arm member, in cantilevered fashion, with one head disposed on each side of the longitudinal axis of the arm member;
  the head suspending member means inluding a unitary flexure member adapted to be secured to the arm member proximate the middle of the flexure member, the flexure member further having first and second ends distal the middle of the flexure, and, at each of such ends a slider frame adapted to support a head/slider assembly,
  the flexure member including a pair of integrally formed leaf springs, one associated with each head/slider assembly to be supported, and means associated with each leaf spring for transferring a pre-load foce generated by the leaf spring to the associated head/slider assembly; and
  a pre-load force removing means comprising a channel-shaped member running longitudinally along the flexure member and unload needle, the needle and channel-shaped member being adapted to cooperate with the pre-load force-transferring means to remove the pre-load force from the head/slider assemblies by insertion of the unload needle in the channel-shaped member.

3. The apparatus of claim 11 further including:
(a) the force-transferring means associated with each head/slider assembly has an inclined ramp member (104, 112) depending toward the channel-shaped member (108);
(b) the channel-shaped member having an opening (105, 113) adapted to receive a ramp member (104, 112) from each force-transferring means; and
(c) all ramp members which are received by the channel-shaped member being inclined in the same direction, toward one end of the flexure member, whereby a single stiff, elongate wire (110) may be inserted in the channel-shaped member from one end thereof to engage and cooperate with the ramp members to remove the pre-load force from the head/slider assemblies.

* * * * *